Dec. 29, 1959          B. E. A. LAWSON          2,918,721
PROCESS FOR FABRICATING A SOCKET MOUNT
Filed March 12, 1953          5 Sheets-Sheet 1
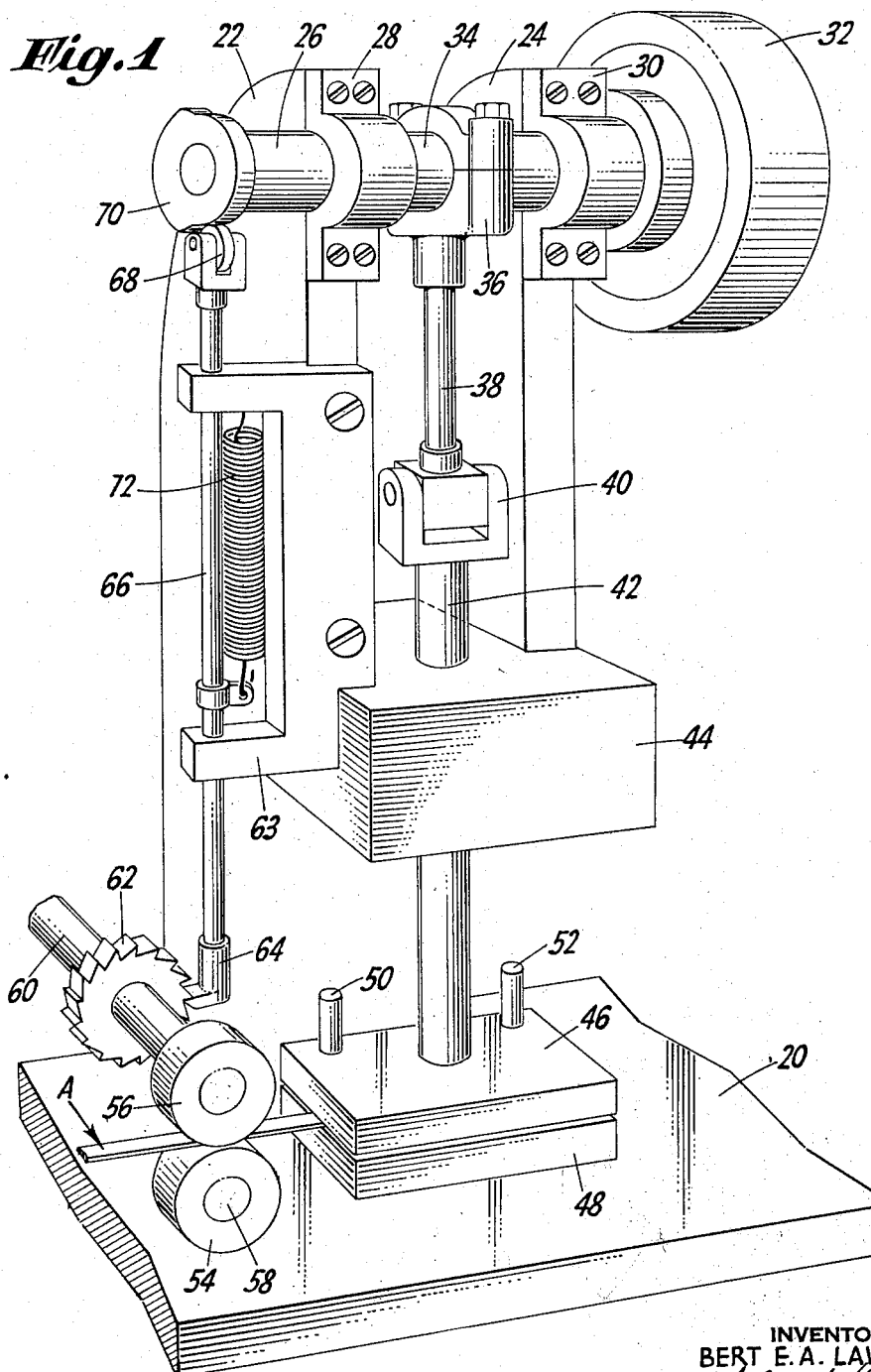
INVENTOR
BERT E. A. LAWSON
BY
ATTORNEY Dec. 29, 1959     B. E. A. LAWSON     2,918,721
PROCESS FOR FABRICATING A SOCKET MOUNT
Filed March 12, 1953     5 Sheets-Sheet 2
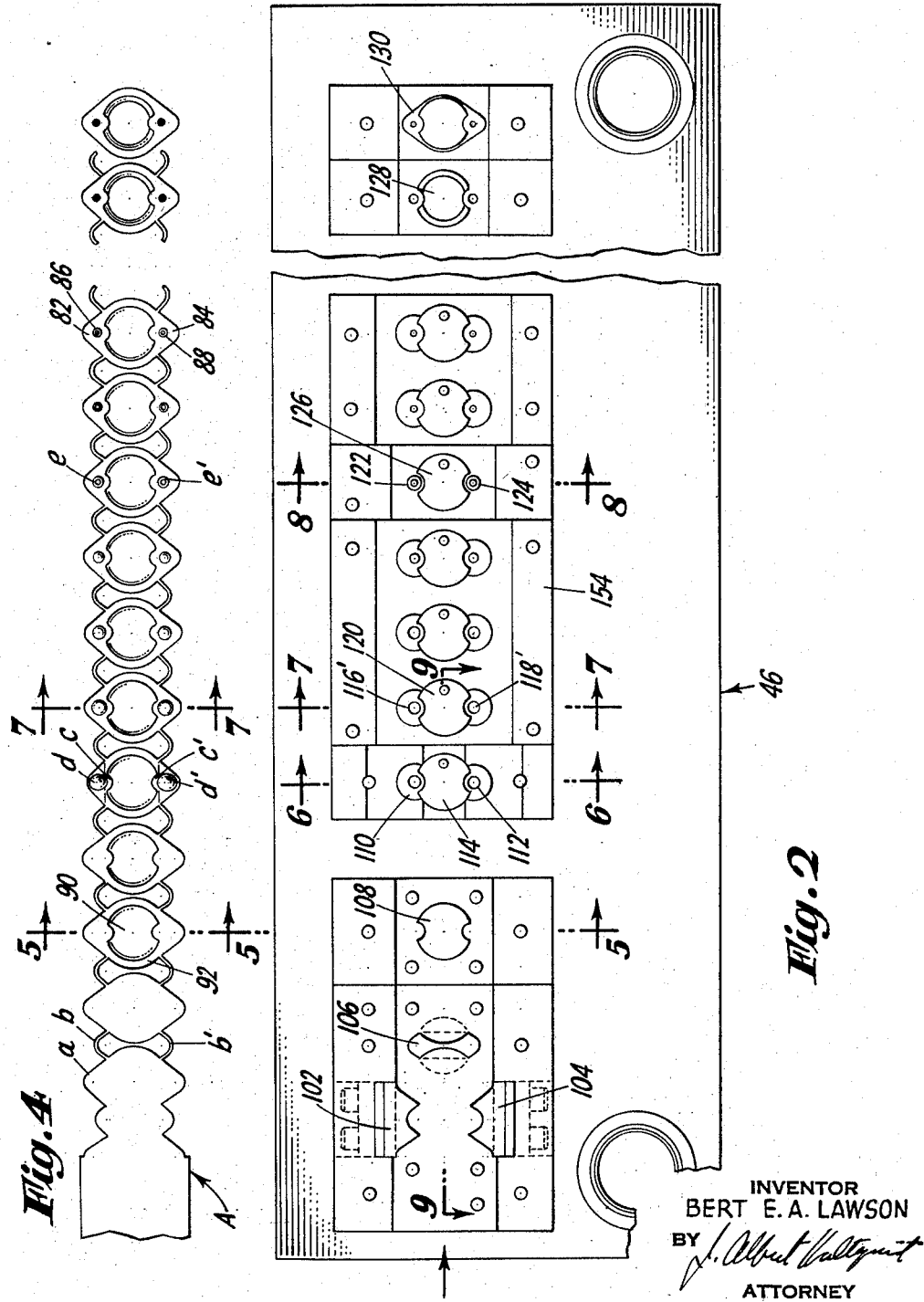
INVENTOR
BERT E. A. LAWSON
BY
ATTORNEY Dec. 29, 1959      B. E. A. LAWSON      2,918,721
PROCESS FOR FABRICATING A SOCKET MOUNT
Filed March 12, 1953      5 Sheets-Sheet 3
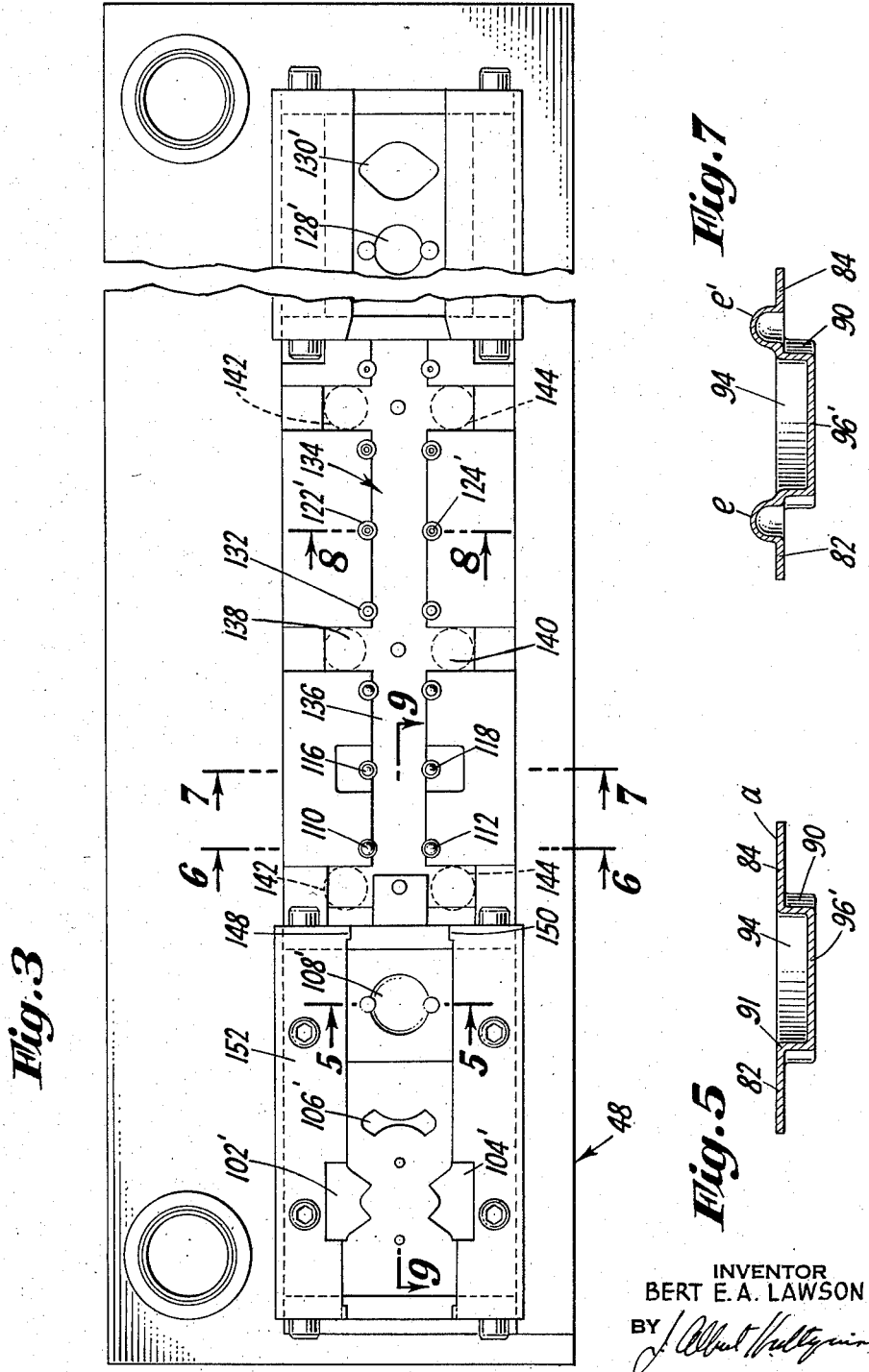
INVENTOR
BERT E. A. LAWSON
BY
ATTORNEY Dec. 29, 1959     B. E. A. LAWSON     2,918,721
PROCESS FOR FABRICATING A SOCKET MOUNT
Filed March 12, 1953                      5 Sheets-Sheet 4
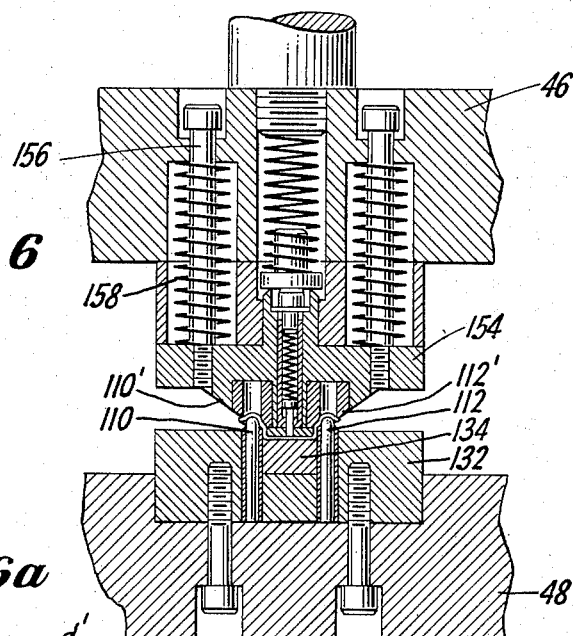
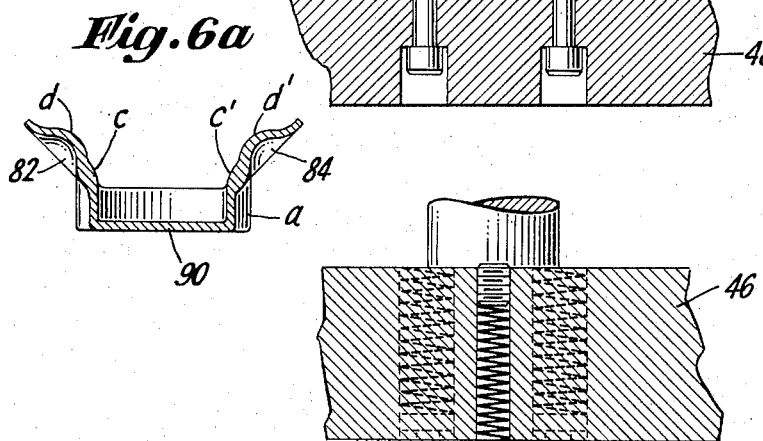
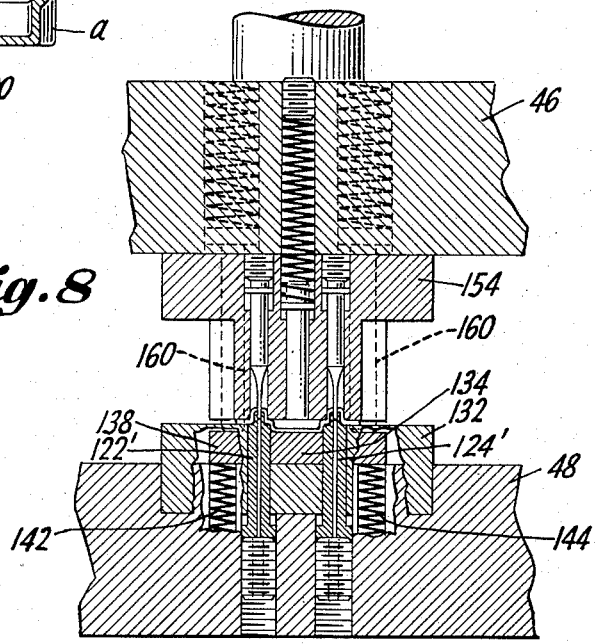
INVENTOR
BERT E. A. LAWSON
ATTORNEY Dec. 29, 1959   B. E. A. LAWSON   2,918,721
PROCESS FOR FABRICATING A SOCKET MOUNT
Filed March 12, 1953   5 Sheets-Sheet 5

INVENTOR
BERT E. A. LAWSON
BY
ATTORNEY

United States Patent Office 2,918,721
Patented Dec. 29, 1959

2,918,721

PROCESS FOR FABRICATING A SOCKET MOUNT

Bert E. A. Lawson, Lakewood, N.Y., assignor, by mesne assignments, to Sylvania Electric Products Inc., Wilmington, Del., a corporation of Delaware Application March 12, 1953, Serial No. 341,851

8 Claims. (Cl. 29—150)

The present invention relates to a process for manufacturing mounts or saddles for tube sockets. In the manufacturing aspect the present invention contemplates a method of, progressively working flat metallic stock to form socket mounts or saddles.

In supporting vacuum tubes on a chassis, it has become increasingly popular to employ a mount or saddle which seats the tube socket body and is secured to the chassis. Usually, the saddle is attached to the chassis by separate eyelets or studs requiring an operator to handle several components. This is time consuming and, especially when mounting miniature vacuum tubes, requires a fair amount of skill and dexterity.

To overcome these and other difficulties, it is to advantage to construct a socket mount or saddle having a seat to secure the socket body and bearing a flange or ears formed with integral eyelets simplifying handling of the mounts and assembly on the chassis. The tube socket is received within the seat and is mounted on the chassis by inserting the eyelets of the saddle in apertures provided in the chassis and thereafter upsetting the ends of the eyelets. In order to assure adequate support for the tube, the seat in the mount should be relatively deep and the eyelets should be dimensioned to allow for a rigid connection to the chassis. In addition to these physical requirements, the manufacture of the socket saddle should be accomplished at low unit cost, especially in view of the extensive use of the saddles.

Various methods and apparatus for constructing socket mounts having the requisite physical properties have been suggested. The use of flat metallic sheet stock in conjunction with a press having one or more reciprocating die sets for progressively forming the sheet stock appears to be exceptionally advantageous since this type of operation readily lends itself to mass production at low unit cost. However, this technique has not heretofore been successful since flat sheet material of a gauge suitable for forming the seat and the eyelets usually will not withstand the stresses and strains incident to embossing relatively deep sockets and drawing integral eyelets. Frequently the sheet material rips in regions intermediate the eyelets and the seat and/or the eyelets are not strong enough to assure adequate support when connected to the chassis.

Accordingly, it is an object of the present invention to provide a novel process for the manufacture of socket saddles or mounts which obviates one or more of the aforesaid difficulties.

It is another object of the present invention to provide a novel method for progressively forming socket saddles from flat metallic sheet stock.

A still further object of the present invention is the provision of a process for forming socket saddles with integral eyelets without adversely affecting the mechanical strength of the saddles.

A still further object of the present invention resides in the progressive dieing out socket saddles from flat sheet stock to provide relatively deep socket-receiving seats and well dimensioned attaching studs or eyelets.

The foregoing and other objects and advantages will become apparent from the following brief description of an illustrative process particularly advantageous for progressively stamping flat metallic blanks to form socket saddles with integral eyelets. Certain of the objects of the present invention are attained by embossing a portion of the flat metallic blank to provide a depending supporting part or seat adapted to embrace the tube socket together with so swaging other portions of the blanks, usually in the form of ears, as to cause the metal of the ears to flow into the regions liable to rip during formation of integral eyelets. These regions most frequently occur contiguous to sharp bends or turns, such as at the shoulder along which the socket-receiving seat merges into the ears and at the base of the eyelets. The swaging operation thickens these regions in an amount sufficient to leave adequate metal after the drawing of the integral eyelets and completion of the saddle. Accordingly, the resultant saddle or mount still includes supporting ears of a thickness substantially the same as the initial thickness of the sheet stock, yet is provided with integral eyelets for attaching the saddle to a chassis or the like.

The nature of the invention will be best understood by reference to the following detailed description of an illustrative process and apparatus, when taken in conjunction with the drawings, wherein:

Fig. 1 is a perspective view of a pressing machine including die sets embodying features of the present invention;

Fig. 2 is a bottom plan view of the top die set of the machine illustrated in Fig. 1;

Fig. 3 is a top plan view of the bottom die set of the machine illustrated in Fig. 1;

Fig. 4 is a plan view of a strip of sheet material illustrating the progressive processing steps along the feed path through the machine;

Fig. 5 is a longitudinal sectional view of a socket mount during processing and taken along the lines 5—5 of the upper and lower die sets of Figs. 2 and 3;

Fig. 6 is a transverse sectional view, with parts broken away, of the swaging die members, taken along the lines 6—6 of the upper and lower die sets of Figs. 2 and 3;

Fig. 6a is an enlarged longitudinal sectional view of a socket mount after being processed through the swaging die members as shown in Fig. 6;

Fig. 7 is a longitudinal sectional view of the socket mount after swaging and shaping taken along the line 7—7 of the upper and lower die sets of Figs. 2 and 3;

Fig. 8 is a transverse sectional view of the puching die members, taken along line 8—8 of the upper and lower die sets in Figs. 2 and 3;

Figure 9:
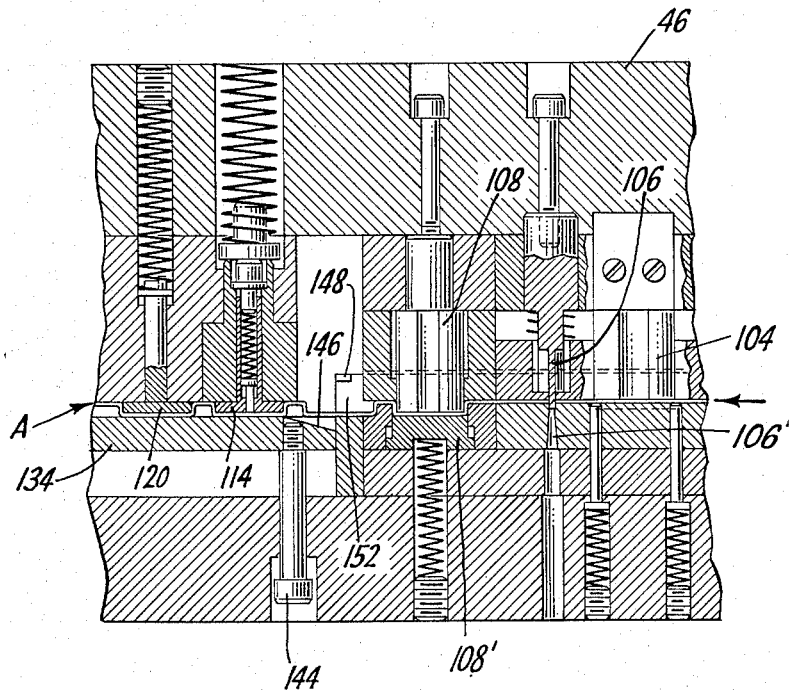
Fig. 9 is a longitudinal sectional view taken substantially along the lines 9—9 of the upper and lower die sets of Figs. 2 and 3.

Referring now to Fig. 1 there is shown a press of the type including fixed and movable die members and having a base 20 with spaced-apart uprights or standards 22, 24. Arranged transversely of the standards 22, 24 is a drive shaft 26 journaled on the standards by bearings 28, 30. Adjacent one of its ends the drive shaft 26 carries a flywheel 32 coupled to a drive motor not shown. The drive shaft 26, intermediate the bearings 28, 30, is turned down to form an eccentric part 34 which carries a split bearing 36 having a depending ram shaft 38. The ram shaft 38 is coupled through a universal joint 40 to a vertical reciprocating shaft 42 slidably supported within a guide plate 44 on the standards 22, 24. The reciprocating shaft 42 carries an upper die set 46 which is movable toward and away from the lower die set 48 on the base 20 in response to vertical reciprocation of the shaft 42. Suitable guide rods 50, 52 are connected to the lower die set 48 and slidably received within the upper die set 46 to preclude rotation of the upper die set 46 relative to the lower die set 48. The respective die sets carry male and female die members, to be subsequently described in detail, which are arranged along the feed path for a strip of metallic stock to be progressively formed into socket mounts.

In order to intermittently feed the strips of sheet stock, designated by the letter A, through the upper and lower die sets 46, 48 a suitable advancing mechanism is provided which is preferably driven by the drive shaft 26. Specifically, a pair of advancing rollers 54, 56 are journaled on spaced-apart shafts 58, 60 with the peripheries of the rollers arranged in substantially coplanar relation with the meeting plane of the die sets 46, 48. The upper advancing or feed roller 56 is driven by a ratchet 62 carried on the shaft 60 and periodically rotated in a counter-clockwise direction by a pawl 64. The pawl 64 is dependingly supported on a vertical operating rod 66 supported on the bracket 63 fixed to the standard 22. Adjacent its upper end, the operating rod 66 carries a cam follower 68 which is biased by spring 72 into engagement with an advancing cam 70 on shaft 26. Accordingly, in response to upward movement of the operating rod 66, as the cam follower 68 riding along the dwell portion of the advancing cam 70, the pawl 64 will index the ratchet 62 to effect stepwise feeding of the metallic strip A through the upper and lower die sets 46, 48.

Figure 10:
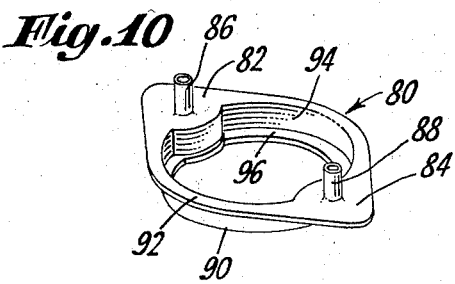
Fig. 10 is a perspective view of a completed socket mount after being separated from the strip.

Referring now specifically to Figs. 2 and 3 there is shown the details of the upper and lower die sets 46, 48. The strip material A to be processed is fed into the die sets 46, 48 from the left side and successively passes through cooperating male and female die members which progressively shape the metallic blank into the completed socket mount 80 of Fig. 10. The socket mount 80 includes a pair of opposed ears or supporting parts 82, 84 formed with integral upwardly projecting cylindrical eyelets or attaching studs 86, 88. Extending in the opposite direction from the eyelets 86, 88, is a socket-seating part 90 which includes an upper marginal flange 92 formed as a continuation of the coplanar ears 82, 84, a depending substantially cylindrical bounding wall 94, and a lower inwardly projecting supporting flange 96.

The upper die set 46 carries male die cutting members 102, 104, 106 which cooperate with complementary female die members 102', 104', 106' on the lower die set 48 for cutting the strip A into individual mount-forming blanks a. Specifically, the male and female die parts or members 102, 102' and 104, 104' shape the opposite ends of the blank a to define the opposed coplanar ears 82, 84 of the completed socket mount 80; while the male and female die parts or members 106, 106' shape the sides of the blank a to define the outer edges of the upper marginal flange 92 of the completed socket mount 80. It is to be noted that the dies 102, 102', 104, 104' cooperate with the dies 106, 106' in forming flexible connectors or straps b, b' intermediate adjacent blanks a for yieldably interconnecting the longitudinal series of blanks formed by the cutting die members.

Immediately following the male cutting die members on the upper die set 46 is a male embossing member 108 which cooperates with a complementary female embossing member 108' on the lower die set 48 for depressing an intermediate portion of the blank a to form the depending socket seating part 90 of the socket mount 80. The blank a, after passing through the male and female embossing die members 108, 108', is shaped to include the depending socket seating part 90 having a cylindrical bounding wall 94 and a solid bottom wall 96'. As clearly seen in Fig. 5, the socket seating part 90 merges into the opposed ears 82, 84 along a sharply turned shoulder 91.

Following the male embossing die member 108 on the upper die set 46 are female swaging die members 110, 112 which cooperate with complementary male die members 110, 112, on the lower die set 48 to cause the metal of the coplanar ears 82, 84 to be crowded toward the socket seating part 90. This crowding or flowing of the metal of the ears reinforces regions c, c', which are subsequently stressed during the formation of the integral eyelets 86, 88. As clearly seen in Fig. 6, the female die members 110', 112' are constructed and arranged relative to the male die members 110, 112 to permit the metal of the ears 82, 84 to be stretched toward the regions of the blank a which are most liable to rip during the drawing of the eyelets 86, 88 from the ears. The male and female die members 110, 112 and 110', 112' deform the ears 82, 84 into divergent relationship and form dome-shaped protuberances d, d' thereon having the reinforced parts c, c' meeting the socket seating part 90 along the shoulder 91. Intermediate the female swaging die members 110, 112 is a male embossing member 114 of substantially the same shape as the male embossing member 108 and effective to further emboss the socket seating part 90 to obtain greater definition and a deeper seat.

Subsequent to the swaging die members, the upper and lower die sets 46, 48 are provided with three successive stages of shaping die members which progressively "neck down" or form the dome-shaped protuberances d, d' into substantially cylindrical extensions e, e' having closed upper ends, as seen in Fig. 7. Specifically, each of the shaping stages includes female shaping die members 116', 118' arranged on opposite sides of a male embossing die member 120 and supported on the upper die set 46, the female shaping die members being complementary to male die members 116, 118 carried on the lower die set 48.

Following the shaping die members the upper and lower die sets 46, 48 are provided with three stages of punching and shaping die members for forming holes in the closed ends of the substantially cylindrical extensions e, e' and for drawing the extensions into elongated cylindrical forms of reduced cross-section as compared to the initial dome-shaped protuberances d, d' and the intermediate substantially cylindrical extensions e, e'. Specifically, the upper die set 46 carries male punching die members 122, 124 arranged on opposite sides of a male embossing member 126 similar to the embossing members 108, 114. The male punching members 122, 124 are receivable within appropriate female punching members 122', 124'. The successive male and female punching members being graduated to reduce the cross-section of the extensions e, e' into the desired elongated cylindrical configuration of the integrally formed eyelets 86, 88.

Arranged along the feed path of the strip material A and following the punching and shaping die members are complementary cut-out die members for removing a substantial part of the bottom wall 96' of the socket-receiving seat 90 to leave the annular supporting flange 96 integral with the cylindrical bounding wall 94. Specifically, a male cut-out die member 128 is supported on the upper die set 46 and is complementary with a female die member 128' on the lower die set 48 to provide the desired circular opening within the bottom wall 96' of the socket mount 80. In lieu of the continuous supporting flange 96, the cut-out male and female die members 128, 128' could be shaped to provide radial legs or the like extending inwardly from the circular bounding wall 94.

The final operation to be performed is accomplished by trimming die members arranged subsequent to the cut-out die member 128, 128'. The upper die set 46 supports a male trimming die part 130 which cooperates with a complementary female trimming die part 130' on the lower die set 48 to cut away the flexible connectors or straps b, b' which yieldably supported the blanks a during movement along the feed path. Additionally, the trimming die members or parts 130, 130' may be constructed to further cut away the marginal edges of the blank in order to provide a more perfect finish to the completed socket mount.

Referring now specifically to Figs. 6, 8 and 9, there is shown the details of the support for the respective male and female die members of the various processing stages, and the construction of the die sets 46, 48 assuring the uninterrupted feeding of the strip A through the progressive dieing-out operations. Specifically, the lower die set 48 carries a supporting table 132 which mounts a resiliently suspended strip clearing pad 134 serving to free the strip A being processed prior to indexing of the strip and subsequent to each stamping operation. The strip-clearing pad 134, seen in plan in Fig. 3, is in the form of an elongated plate 136 having longitudinally spaced, laterally projecting extensions 138, 140. Underlying the respective pairs of extensions 138, 140 of the strip clearing pad 134, are springs 142, 144 which bias the pad 134 upwardly from the supporting table 132 to free the stamped blanks from the die members on the lower die set 48. Suitable bolts 144 (Fig. 9) limit the upward travel of the strip clearing pad 134. In Fig. 3, it can be seen that the elongated plate 136 of the strip clearing pad 134 is arranged to support the embossed socket seating part 90 of the mount during processing of the ears 82, 84 to form the integral eyelets, namely the swaging, shaping and punching operations. The leading edge of the strip clearing pad 134 is beveled to provide an inclined part 146 assuring the unimpeded advance of the strip A onto the strip-clearing pad 134. Additionally guide ears 148, 150 are provided on longitudinal plates 152 to laterally confine the strip A against movement from the feed path after leaving the embossing die members 108, 108'.

The female swaging die members 110', 112', the female shaping die members 116' and 118', and the male punching and forming die members 122, 124 are all supported on a common cushioning head 154 which is resiliently suspended from the upper die set 46. The cushioning head 154 is movable relative to the die set 46 to an extent determined by the length of supporting bolts 156. The resilient suspension for the cushioning head 154 includes springs 158 surrounding the bolts 156 and normally biasing the cushioning head downwardly and away from die set 46. Accordingly, as the upper die set 46 is moved toward the lower die set 48 under the control of the vertically reciprocating shaft 42, the die members carried thereby will come into contact with the strip A which rests upon the strip-clearing pad 134 whereupon the strip-clearing pad will move to its lowermost position. The cushioning head will travel through a cushioning stroke to avoid the instantaneous application of pressure to the blank a being formed. When the cushioning head 154 reaches its uppermost position as determined by the length of the bolts 156, further downward movement of the upper die set 46 completes the forming operation. Thereafter, as the die set 46 moves upwardly, the strip-clearing pad 134 returns to its upward position clearing the strip A from the die members of the lower set 48. Thereupon the strip A is indexed to advance the blanks a for further processing.

At the beginning and end of the feed path, the upper die set 46 is provided with spring biased hold-down bolts 160 which are arranged on opposite sides of the strip A and restrain the strip against movement from the feed path.

For a complete understanding of the processing of the flat metallic stock to form socket mounts in accordance with the principles of the present invention, reference will now be had to Fig. 4 wherein a strip of sheet metal is illustrated in alignment with one of the die stocks shown in Fig. 2 and showing the successive stages of processing. During a first operation, the flat strip A of thin metallic stock is passed through the cutting die members 102, 104, 106 and corresponding parts 102', 104', 106' of Fig. 3 to cut the strip into the blanks a. These blanks are interconnected by the flexible connectors b, b', which permit longitudinal movement of the blanks relative to each other during the progressive stamping operations. Thereafter, the blanks a are formed with the centrally-disposed socket seating parts 90 by the cooperating action of embossing die members 108, 108'. Then, the blanks, with the embossed socket seating parts 90, are brought into position relative to the swaging die members 110, 112, 110', 112' which cause material of the ears 82, 84 to be drawn inwardly and toward the sharply turned shoulder 91 of socket seating parts 90. Concurrently, the swaging die members coact to form the preliminary dome-shaped protuberances d, d'. During the swaging operation, the embossing die member 114 enters the socket seating parts 90 to increase the definition thereof. Subsequent to the swaging of the ears 82, 84 to form the reinforced parts c, c', the partially processed blanks a are passed through the shaping die members 116, 118, 116', 118'. During the successive shaping stages, the dome-shaped protuberances d, d' are formed into the substantially cylindrical extensions. It is to be observed that the successive shaping stages include male and female die parts of decreasing cross-sectional areas to "neck down" the protuberances d, d'. After leaving the successive shaping stations, the blanks a proceed through the punching and shaping die members 122, 124, whereat the closed ends of the cylindrical extensions e, e' are punched out and the extensions drawn into the substantially cylindrical eyelets 86, 88. The final stamping operations include the cutting away of the bottom walls 96' of the socket seating parts 90 by the cooperating cut-out die members 128, 128', and the separation of the blanks a from each other by the trimming die members 130, 130' which remove the flexible connectors b, b' and, provide a final trimming cut around marginal edges of the blanks a.

From the foregoing it is apparent that the process and apparatus of the present invention may be advantageously employed to form socket mounts of a requisite physical configuration. The aforesaid process is accomplished by the use of techniques particularly advantageous from the standpoint of economy and adaptability to routine mass production methods. Further the risk of drawing out the material of the sheet stock to a point where fracture is liable to occur is minimized thereby rendering possible the use of a reciprocating die member having a relatively long stroke with flat sheet stock of comparatively thin gauge.

While in accordance with the provisions of the statutes, we have illustrated and described the best form of embodiment of our invention now known to us, it will be apparent to those skilled in the art that changes may be made in the form of the apparatus disclosed and in the method without departing from the spirit of our invention as set forth in the appended claims and that in some cases certain features of our invention may be used to advantage without a corresponding use of other features.

What I claim is:

1. A process of fabricating a socket mount with integral eyelets from a strip of flat metallic stock comprising the steps of cutting said strip into a longitudinally spaced series of blanks interconnected by resilient straps, embossing said blanks to form each of said blanks into a supporting part and a socket-seating part, swaging the supporting part of each of said blanks to provide reinforced regions contiguous to said socket-seating part and progressively shaping said supporting part to form said integral eyelets.

2. A process of fabricating a socket mount with integral attaching studs from a flat metallic blank having coplanar ears comprising the steps of embossing an intermediate portion of said blank to form a socket-seating part, swaging said ears into divergent relationship with respect to each other to form protuberances thickened contiguous to said socket-seating part, returning said ears to the initial coplanar position, and shaping said protuberances to form said integral attaching studs.

3. A process of fabricating a socket mount with integral eyelets from a strip of flat metallic stock comprising the steps of cutting said strip into a longitudinally spaced series of blanks, embossing said blanks to form each of said blanks into a supporting part and a socket-seating part having a bottom wall and a bounding wall, swaging the supporting part of each of said blanks to provide reinforced regions contiguous to the bounding wall of said socket-seating part, progressively shaping said supporting part to form said integral eyelets, and cutting out a substantial portion of the bottom wall of said socket-seating part.

4. A process of fabricating a socket mount with integral attaching studs from a flat metallic blank having coplanar ears comprising the steps of embossing an intermediate portion of said blank to form a socket-seating part, swaging said ears into divergent relationship with respect to each other to cause metal of said ears to flow into regions contiguous to said socket-seating part, returning said ears to the initial coplanar position, and drawing integral attaching studs from said ears.

5. A method of forming a socket mount of the type including a seat and at least one projecting ear having an integral eyelet including the steps of forming a flat strip of metallic stock into a blank, embossing said blank to form a socket-seating part having a bottom wall and a supporting ear adjoining said socket-seating part at a sharply-turned shoulder, flowing material of said ear toward said shoulder and concurrently forming a dome-shaped protuberance in said ear, and drawing an eyelet from said dome-shaped protuberance.

6. A method of forming a socket mount of the type including a seat and at least one projecting ear having an integral eyelet including the steps of forming a flat strip of metallic stock into a series of flexibly interconnected blanks, embossing each blank to form a socket-seating part having a bottom wall and a supporting ear adjoining said socket-seating part at a sharply turned shoulder, flowing material of said ear toward said shoulder and concurrently forming a dome-shaped protuberance in said ear, drawing an eyelet from said dome-shaped protuberance, and cutting away said bottom wall of said socket-seating part and separating successive completed socket mounts from each other.

7. A method of forming a socket mount of the type including a seat and a pair of projecting ears each having an integral eyelet including the steps of forming a flat strip of metallic stock into a series of blanks flexibly interconnected by straps, embossing successive blanks to form a socket-seating part having a bottom wall and a supporting ear adjoining said socket-seating part at a sharply turned shoulder, flowing material of said ear toward said shoulder, drawing an eyelet from each of said ears, and cutting away said bottom wall of said socket-seating part and separating successive completed socket mounts from each other by trimming off said straps.

8. In the manufacture of socket mounts of the type including an embossed socket part and ears projecting from said socket part, the steps including embossing a blank to form a socket part including a depression having a bottom wall and an upstanding bounding wall and a supporting part having ears projecting from said socket part and joined to said upstanding bounding wall at a sharply-turned shoulder, flowing metal of said ears toward said shoulder to reinforce said shoulder, further embossing said depression to improve the definition thereof, drawing integral eyelets from said ears, and cutting away a substantial portion of the bottom wall of said socket part.

References Cited in the file of this patent

UNITED STATES PATENTS

| | | |
|---|---|---|
| 1,040,274 | Chambers | Oct. 8, 1912 |
| 1,368,565 | Limont | Feb. 15, 1921 |
| 1,659,266 | Hommel | Feb. 14, 1928 |
| 1,698,139 | McElroy | Jan. 9, 1929 |
| 1,799,596 | Ludwig | Apr. 7, 1931 |
| 1,882,352 | Woodhead | Oct. 11, 1932 |
| 1,997,871 | Miller | Apr. 16, 1935 |
| 2,070,784 | Cox | Feb. 16, 1937 |
| 2,395,215 | Cochrane | Feb. 19, 1946 |
| 2,529,279 | Breisch | Nov. 7, 1950 |
| 2,585,072 | Alexy | Feb. 12, 1952 |
| 2,610,390 | Locke | Sept. 16, 1952 |
| 2,618,840 | Danly | Nov. 25, 1952 |